United States Patent
Fischer

[15] 3,690,802
[45] Sept. 12, 1972

[54] APPARATUS FOR THE MANUFACTURE OF HOLLOW OBJECTS, IN PARTICULAR BOTTLES OF THERMOPLASTIC MATERIAL UTILIZING INJECTION BLOWING METHOD

[72] Inventor: Stefan Fischer, Im Korresgarten 21, Lohmar, Bezirk Cologne, Germany

[22] Filed: Aug. 26, 1970

[21] Appl. No.: 67,090

[30] Foreign Application Priority Data

| Aug. 29, 1969 | Germany | P 19 43 873.4 |
| June 26, 1970 | Germany | P 20 31 585.9 |
| July 23, 1970 | Germany | P 20 36 523.5 |

[52] U.S. Cl. ................................ 425/326, 425/324
[51] Int. Cl. ............................................. B29d 23/03
[58] Field of Search ........ 18/5 BA, 5 BH, 5 BJ, 5 BK, 18/5 BP, 5 BT; 425/326

[56] References Cited

UNITED STATES PATENTS

| 3,492,690 | 2/1970 | Goldring et al. | 425/326 X |
| 3,584,337 | 6/1971 | Aoki | 18/5 BJ |
| 3,480,993 | 12/1969 | Schjeldahl et al. | 18/5 BJ |

Primary Examiner—H. A. Kilby, Jr.
Attorney—Lilling & Siegel

[57] ABSTRACT

An apparatus for the production of hollow articles, such as bottles, from thermoplastic synthetic plastic material by the injection and blowing process, having an extruder, an injection mould, a blowing mould arranged at a distance therefrom and a transport or transmission device which bring the pre-mouldings formed in said injection mould into said blowing mould after removal from said injection mould. The apparatus includes several intermittently advanceable blowing mandrels formed as mould cores for the injection mould, which are provided with supply conduits for a heating or cooling medium as well as a blowing air supply conduit, the cooling or heating medium throughflow conduits of all blowing mandrels are connected one behind the other and the cooling or heating medium flows successively through all blowing mandrels.

18 Claims, 5 Drawing Figures

Patented Sept. 12, 1972

INVENTOR
STEFAN FISHER
BY Lilling & Siegel
ATTORNEYS

INVENTOR
STEFAN FISHER
BY Lilling & Siegel
ATTORNEYS

INVENTOR
STEFAN FISHE.
BY Lilling + Siegel
ATTORNEYS

APPARATUS FOR THE MANUFACTURE OF HOLLOW OBJECTS, IN PARTICULAR BOTTLES OF THERMOPLASTIC MATERIAL UTILIZING INJECTION BLOWING METHOD

This application is related to my co-pending patent application filed on the same day as this present application and identified as U.S. Ser. No. 67,091 and entitled "Apparatus For The Manufacture Of Hollow Objects Of Thermoplastic Material."

BACKGROUND OF THE INVENTION:

This invention relates to an apparatus for the production of hollow articles, especially bottles, from thermoplastic synthetic plastic material by the injection of blow-moulding process.

The invention concerns apparatus for the production of hollow articles, especially bottles, from thermoplastic synthetic plastic material by the injection and blow-moulding process, with an extruder, an injection mould, a blowing mould arranged at a distance therefrom and a transport or transmission device which brings the pre-moulding formed in the injection mould, after withdrawal from the mould, into the blow mould and comprises several intermittently advanceable blowing mandrels formed as mould cores for the injection mould, which are provided with supply conduits for a heating or cooling medium, as well as a supply conduit for blowing air.

In such apparatus, where the blowing mandrels can be arranged in the manner of a star on a hub rotatable about a fixed spindle, naturally in the further stepping of the blowing mandrel star the connection with the supply conduits for the heating or cooling medium must be constituted in every position and for every blowing mandrel. In this case it has proved disadvantageous to connect the mandrels in parallel for the passage of heating or cooling medium. Even slight differences in the dimensions of the conduit cross-sections in the different mandrels result in an irregular heating or cooling of these mandrels, which must lead to unsatisfactory products if the inflation of the pre-moulding must take place at precisely determined temperatures.

In this case an adjustment of the passage cross-sections in the individual mandrels as a rule is not practicable or involves great difficulties, so that it was necessary to seek for possibilities of eliminating these difficulties with simple means.

For this purpose, in an apparatus of the stated kind for the production of hollow articles from thermoplastic synthetic plastic material, the invention provides primarily that the cooling or heating medium passage conduits of all blowing mandrels are connected in series, so that the cooling or heating medium flows through all blowing mandrels in succession. If then the individual mandrels should have different passage resistances, their influence is reduced or eliminated and a substantial unification of the temperature course in the entire system is achieved.

Many possibilities arise in this case for the supply and withdrawal of the cooling or heating medium. Thus by way of example in the cases where a precise temperature control of the pre-moulding is important for the blowing operation, the supply of the cooling or heating medium can be effected at the mandrel situated in the blowing position. Naturally, it is also possible to effect the supply of the cooling or heating medium at the mandrel situated in the injection position and serving as mould core of the injection mould, or equally at any other point. Moreover the cooling medium can be guided through the blowing mandrels successively in the direction of the intermittent further stepping. It is, however, also possible to conduct the cooling or heating medium through the blowing mandrels contrarily of their direction of further stepping. Other series connections are also conceivable and practicable. The connection of the cooling or heating medium passages of the mandrels with one another and the supply and withdrawal of the cooling or heating medium can be effected in a simple way through connection passages or bores in the spindle on which the hub of the blowing mandrel star with its supply passages is rotatable.

Since for manufacturing reasons a certain difference between the spindle diameter and the internal diameter of the hub is unavoidable, the escape of a certain quantity of the cooling or heating medium, dependent upon chance, for example from the feed passage to the discharge passage, would be possible for the heating medium of each blowing mandrel and even to other blowing mandrels, which act as uncontrolled shunt to the cooling or heating medium conduits of the individual mandrels. Such uncontrollable shunts must be avoided if a reliable temperature control is to be achieved. The invention further provides that in at least one of the parts movable in relation to one another, that is the hub and/or the spindle, there is arranged a radially movable sealing piece containing the connection conduits, which bears with a certain pressure on the other of the parts movable in relation to one another. The application pressure of the sealing piece can here be achieved by spring action. In a preferred form of embodiment of the apparatus according to the invention, sealing pieces are radially movably inserted into the spindle, of which pieces each covers the supply passage and the discharge passage of two adjacent blowing mandrels and is in turn sealed off from the spindle. In this case the seal by reason of its arrangement and/or formation can at the same time ensure the resilient application pressure of the sealing piece.

If in the apparatus as initially stated the inflation of the pre-moulding is to be effected at quite specific temperatures lying in a narrow range, for example in the case of PVC in what is called the thermo-elastic range between about 100 and 130° C, only minimal deviations from the predetermined inflation temperature are permissible for satisfactory working of the apparatus, which temperature is determined substantially by the heating or cooling of the blowing mandrels and necessitates a thoroughly careful temperature control of the blowing mandrels. In this case, as has appeared, a unification of the temperature in all blowing mandrels can be achieved only relatively coarsely by a series connection of their cooling or heating medium conduits alone, more especially controlling to specific temperature values is possible only coarsely over the entire throughflow by raising or lowering of the temperature of the throughflow medium, in which case unavoidable irregularities are difficult to detect and compensate in manufacture. This applies also insofar as unequal temperatures distributed over the length of a mandrel can establish themselves.

These drawbacks and difficulties are to be eliminated according to a further feature of the invention and an apparatus is to be provided which renders possible an adjustment of the throughflow of heating or cooling medium and especially of the temperature of the blowing mandrels with the simplest possible means, in that shunt conduits connectable in parallel with parts of the series connection of the heating or cooling medium conduit are provided. In this case not only is the throughflow quantity through the shunt conduit to be variable, by means for example of the throughflow cross-section, but also the length and position of the shunt conduit are to be selectable. It is also possible if desired for two or more shunt conduits to be connected in parallel in different positions and with different lengths to one section of the cooling or heating medium conduit.

The most manifold possible embodiments arise in the constructional respect. Thus by way of example it is possible to connect the supply passage with the discharge passage for the cooling or heating medium even in the foot of the blowing mandrels by a more or less large bore, and thus to permit only a part of the cooling or heating medium to flow through the blowing mandrel itself. In the case of blowing mandrels with coaxially arranged inflow and outflow passages for the cooling or heating medium, it is possible if desired to provide further shunt bores or openings distributed over the length of these passages, which connect the inlet and return conduits with one another. The best possibilities of regulation for the cooling or heating medium current can be achieved by the provision of three preferably coaxial passages for the cooling or heating medium in the blowing mandrel, of which the outer two are more or less greatly connectable with one another and the throughflow medium is deflectable more or less greatly from the one of these two passages into the other, in which case of course it can be conducted as often as desired from the one passage into the other and back again and it is even possible for passage apertures to the third throughflow passage of the blow mandrel to be provided as shunt connections. To favor the deflection of the throughflow medium from one passage into the other and back, constrictions can be provided in these passages, which may possibly be formed by displaceable elements.

The invention permits of many forms of embodiments of the apparatus and many modifications. Various possibilities of embodiment with the parts essential to understanding are represented partially diagrammatically as examples in the accompanying drawings, wherein.

Figure 1:
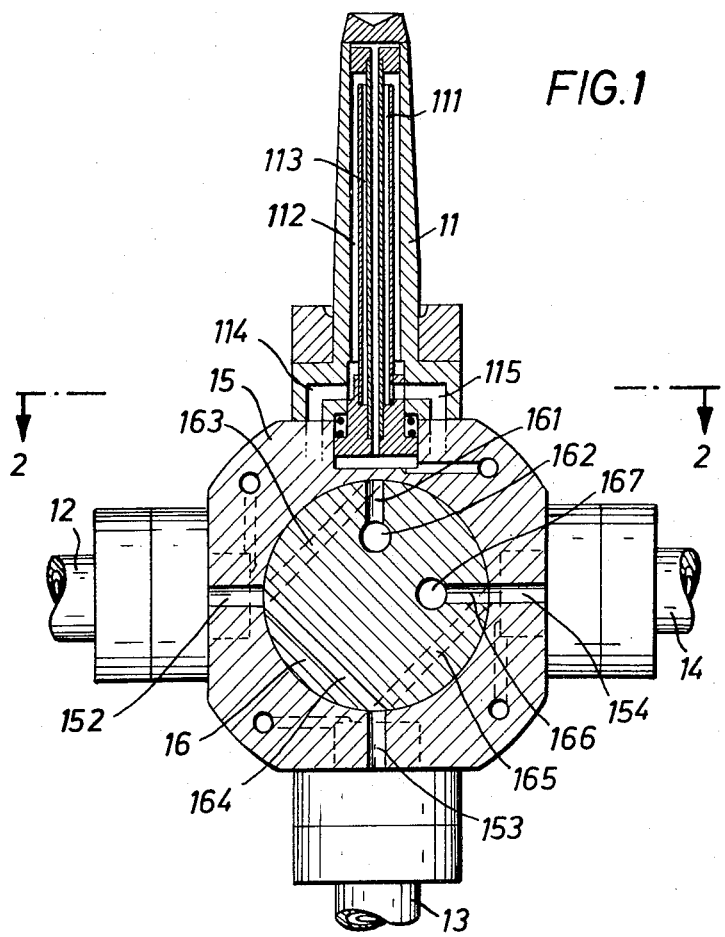
FIG. 1 shows a longitudinal section through a blowing mandrel star with parts partially broken away, approximately along the line 1—1 in FIG. 2, the fully illustrated blowing mandrel being reproduced turned through 90° about its axis.
Figure 2:
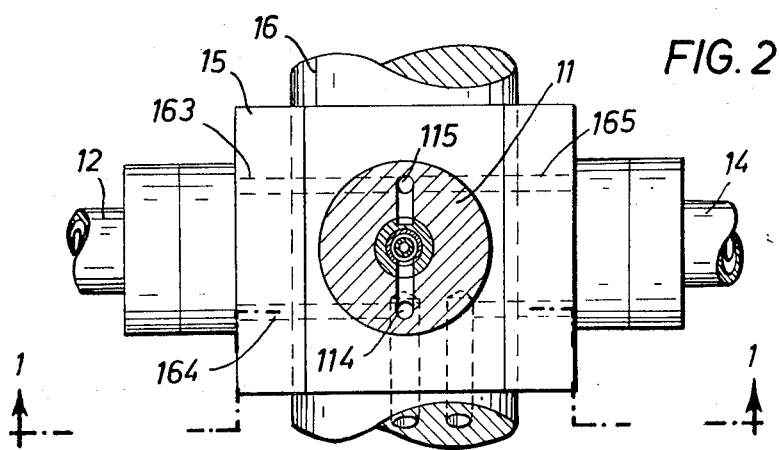
FIG. 2 shows a section approximately along the line 2—2 in FIG. 1.

DESCRIPTION OF THE PREFERRED EMBODIMENT:

In the drawings, the basis was adopted of an apparatus having four blowing mandrels 11, 12, 13 and 14 which, offset by 90° to each other, are arranged on a hub 15 which is rotatable about a spindle 16. Let it be assumed that in the position as illustrated the blowing mandrel 11 protrudes into a blowing mould (not shown), while the blowing mandrel 12 extends as mould core into an injection mould (not shown).

As may be seen from the blowing mandrel 11 represented in section, the blowing mandrels are provided with a blowing air supply conduit 111 and passages 112 and 113 for a heating or cooling medium, the inlet passage 114 and outlet passage 115 of which lie one behind the other in the direction of the spindle 16 and are represented turned through 90° in the drawing. The supply passage 114 lies in one direction with the supply passage 161 of the spindle 16, which is connected with a longitudinal bore 162 of the spindle through which the cooling or heating medium is supplied which departs from the blowing mandrel through the discharge passage 115. This discharge passage 115 is in communication through the hub 15 with the inlet opening of a bore 163 of the spindle 16 which supplies the cooling or heating medium to the supply passage of the blowing mandrel 12, from which it departs again through the associated discharge passage and the bore 152, extending in the same direction, of the hub 15. A further connecting passage 164 conducts the cooling or heating medium through the bore 153 of the hub 15 to the mandrel 13 and hence it is fed through a third connecting bore 165 to the mandrel 14. Finally the cooling or heating medium, after it has past through the mandrel 14, passes through the bore 154 of the hub 15 and the discharge passage 166 into a longitudinal bore 167 by which it is conducted away. In this way all blowing mandrels are connected in series as regards the throughflowing cooling or heating medium.

Figure 3:
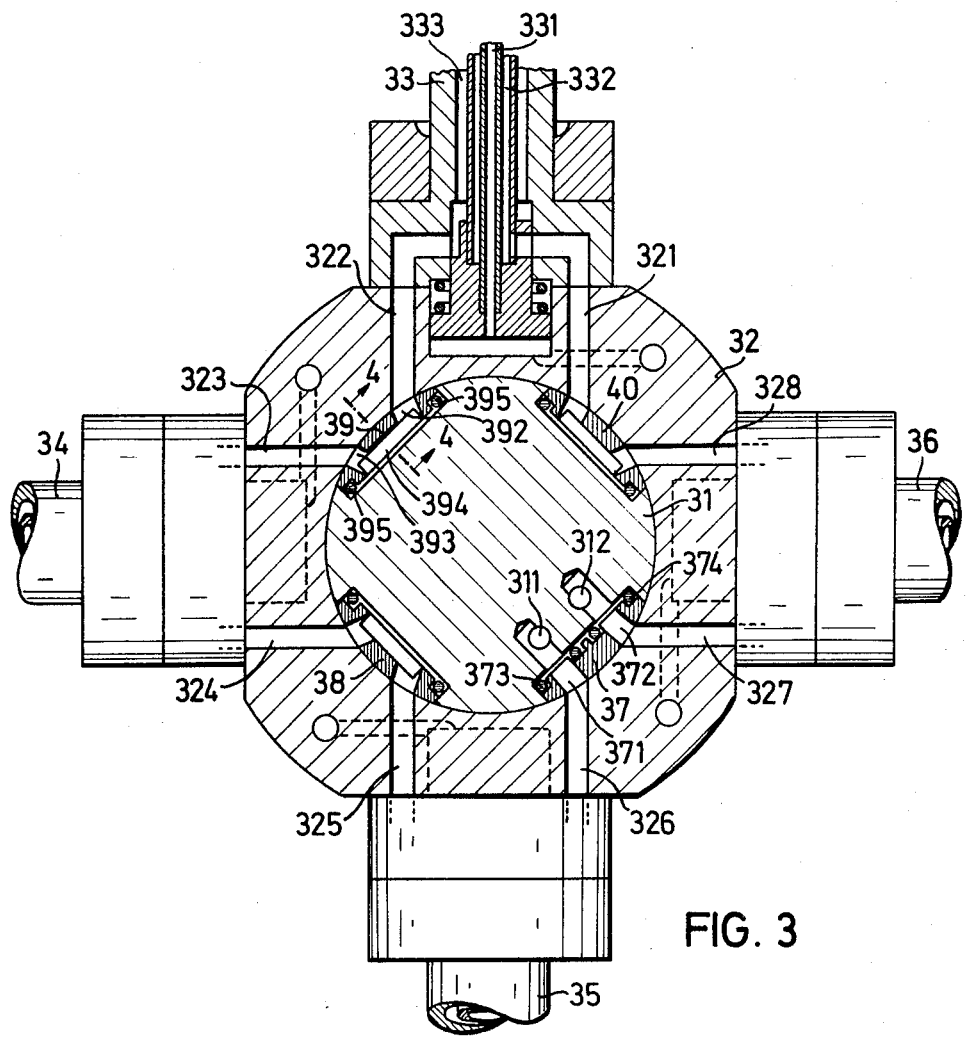
FIG. 3 shows a somewhat modified form of embodiment of a blowing mandrel star with sealing pieces arranged in the axis.
Figure 4:
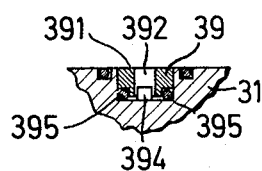
FIG. 4 shows a section approximately along the line 4—4 of FIG. 3.

In the modified form of embodiment according to FIGS. 3 and 4, which should be selected when an absolutely secure seal is to be achieved between spindle and hub, as necessary for an extremely precise temperature control, a hub 32 which carries four blowing mandrels 33, 34, 35 and 36, is rotatably arranged on a spindle 31. Each blowing mandrel possesses an air supply passage, such as the passage 331 of the blowing mandrel 33, and an inlet and return conduit for the cooling or heating medium, such as the conduits 332 and 333 of the blowing mandrel 33. As supply and return conduits to each blowing mandrel, in each case in the hub 32 there are provided a supply and a return passage for the cooling or heating medium, of which the passages 321 and 322 are allocated to the mandrel 33, the passages 323 and 324 to the mandrel 34, the passages 325 and 326 to the mandrel 35 and the passages 327 and 328 to the mandrel 36. The cooling or heating medium conduits of all mandrels are connected in series and the supply of the cooling or heating medium takes placed through one of two longitudinal bores 311 or 312 which are arranged in the spindle 31. In the example as illustrated the basis was adopted that the supply takes place through the conduit 311 and the return through the bore 312.

The connection of the cooling or heating conduits of the blowing mandrels with the supply and return bores 311 and 312 and the connection of the supply passages of the blowing mandrels in series with one another take place through sealing pieces which are arranged in recesses of the spindle 31. These sealing pieces are radially movably mounted in the recesses of the spindle 31. In all, four sealing pieces 37, 38, 39 and 40 are provided of which the three last-mentioned, which at the same time effect the series connection of the cooling or heating medium conduits of the mandrels, are formed in the same way while the sealing piece 37, which effects the connection with the supply bores 311 and 312, with substantially equal dimensions has a slightly different formation. The formation of the sealing pieces 38, 39 and 40 which are made similar may be seen from FIG. 3 of the drawing in combination with FIG. 4, where a cross-section through the sealing piece 39 is illustrated. The sealing piece possess a flat bottom surface and opposite to this an outer surface 391 adapted to the doming of the hub 32. Two connecting bores, such as the bores 392 and 393 of the sealing piece 39, constitute the connection with the supply and return passages of two adjacent mandrels and a connection passage 394 fitted in the sealing piece 39. The sealing piece itself is sealed off against the hub 31 by a sealing ring 395 surrounding the connecting passage 394, which at the same time ensures that the sealing piece abuts with its domed outer surface with a certain pressure on the internal periphery of the hub 32. The sealing piece 37 possesses only two connecting bores 371 and 372, which are not themselves connected with one another. Rather each is independently sealed against the spindle by a sealing ring 373 and 374 respectively surrounding them and those two sealing rings ensure that the sealing piece 37 is pressed with a certain pressure against the hub 32.

The cooling or heating medium supplied through the bore 311 passes by way of the connecting bore 371 of the sealing piece 37 into the supply passage 326 for the blowing mandrel 35 and is then fed through the return passage 325 and the sealing piece 38 to the blowing mandrel 34, whence it passes by way of the sealing piece 39 into the blowing mandrel 33, whence it is conducted further through the sealing piece 40 to the blowing mandrel 36. The cooling or heating medium leaving this blowing mandrel through the return passage 327 is then finally returned through the connecting bore 372 into the bore 312. The sealing pieces 37, 38, 39 and 40 by reasons of their mobility in the radial direction here ensure that a sufficiently tight connection is produced between the conduit joints.

Figure 5:
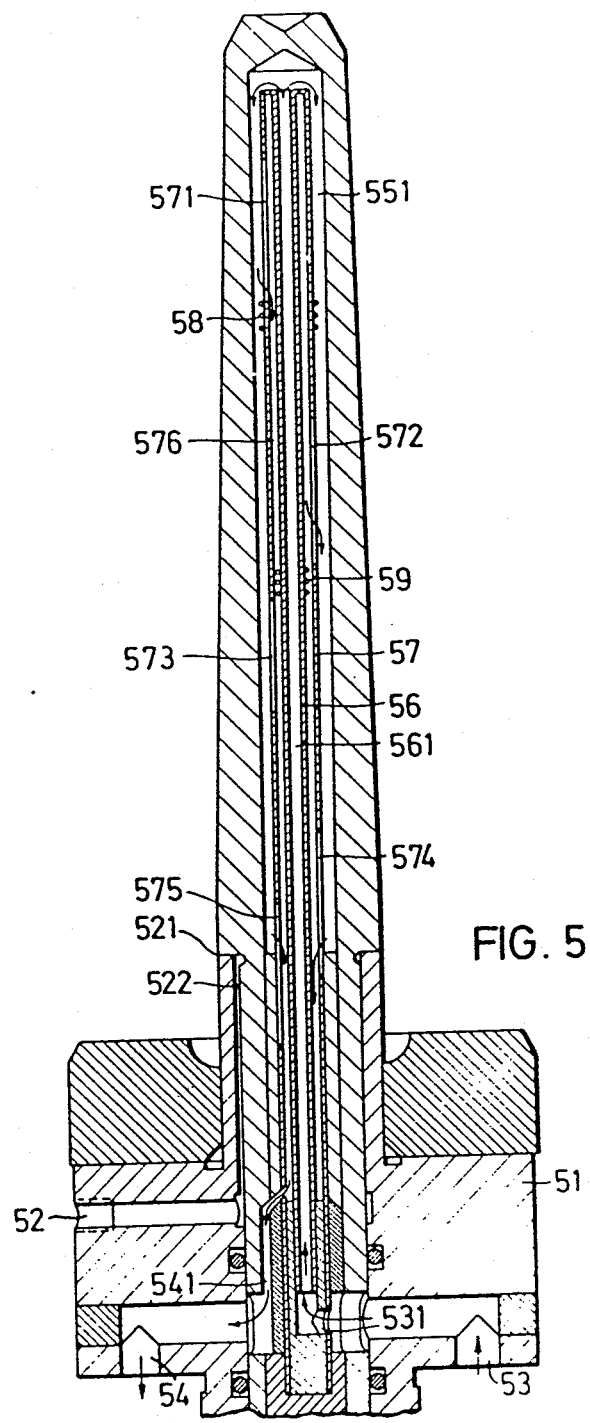
FIG. 5 shows a blowing mandrel in a somewhat modified form of embodiment with shunt passages.

In the form of embodiment of a blowing mandrel as represented in FIG. 5, which discloses the possibilities of a fine adjustment with the aid of shunt connections, a blowing mandrel is arranged for displacement in the axial direction in the foot 51, which comprises a supply passage 52 for the blowing air and supplying passage 53 and a discharge passage 54 for the cooling or heating medium. The displaceability serves to open and close an annular outlet port 521, connected through a connection passage 522 with the blowing air supply passage 52, at the lower end of the blowing mandrel, which can serve at the same time as mould core of an injection mould for the pre-moulding.

The blowing mandrel shown in FIG. 5 possesses a substantially cylindrical internal space 551 in which the cooling or heating medium circulates. Two thin-walled tubes 56 and 57 arranged coaxially with one another and with the inner wall of the internal space 551 extend into this internal space 551 from the foot 51. The inner tube 56 is connected with its inner space 561 through a passage 531 with the inlet passage 53 and opens at the upper end of the blowing mandrel into the internal space 551. The outer of the two tubes 57 is provided with openings 571, 572, 573, 574 and 575 and divides the annular cavity of the blowing mandrel 55 on the outside of the supply tube 56 into two tubular passages, at least one of which is connected at the lower end through a passage 541 with the outflow passage 54.

With the aid of a throughflow passage system formed in this way the cooling or heating medium can be permitted to flow in many ways through the blowing mandrel internal space and the intensity of the cooling or heating can be influenced on specific sections. For this purpose it is only necessary for the provided ports 571 to 575 to be closed more or less, for example soldered shut, or for additional openings to be provided in the tube 57, in which case a complete or partial deflection of the throughflow medium from the one passage into the other can be ensured by constrictions which are formed by helical springs clamped on to the tubes 56 and 57 or with sleeves with more or less great wire thickness, as for example with the springs 58 and 59. By possibily additionally provided bores in the wall of the tube 56 it is possible to achieve a greater shunt effect for the main throughflow passage which is formed by the tube 57 and the wall of the cavity 551. A shunt to the entire blowing mandrel 55 is achievable in a simple manner due to the fact that the wall between the inflow passage 53 and the outflow passage 54 is provided with a more or less large opening.

In the example of embodiment as illustrated in the drawing the throughflow of the throughflow medium is indicated by arrows. It passes through the inlet 53 and the passage 531 into the internal space 561 of the tube 56, through which it is conducted as far as the head of the blowing mandrel 55. The throughflow medium flowing downwards again on the outside of the tube 57 is deflected at the constriction formed by the spring 58 at least for a large part into the internal space 576 of the tube 57. The constriction formed by the spring 59 then deflects the throughflow medium into the main passage 551 again, whence it is conducted finally through the ports 574 and 575 again into the space 576 and thence through the passage 541 into the outflow passage 54.

I claim:

1. In a blow moulding machine having an extruder, an injection mould and a blowing mould, a transport device for bringing the pre-mouldings formed in the injection mould into the blowing mould; said machine adapted for the production of hollow articles, such as bottles, from thermoplastic synthetic plastic material, and comprising several intermittently advanceable blowing mandrels formed as mould cores about a central hub forming a mandrel star for said injection and blowing moulds, each of said mould cores being provided with supply conduits for a heating or cooling medium as well as a blowing air supply conduit, the cooling or heating medium throughflow conduits of all of said blowing mandrels being serially arranged and connected one behind the other so that the cooling or heating medium flows successively through all of said blowing mandrels, each of which at any one time is in a different step of the working cycle of said machine, whereby irregular heating or cooling of said mandrels is substantially eliminated and precision temperature control of said pre-mouldings is achieved at any one point or step in the cycle of said machine.

2. The apparatus according to claim 1, wherein the supply of the cooling or heating medium takes place at the mandrel situated in the blowing position.

3. The apparatus according to claim 2, wherein the cooling or heating medium flows through the blowing mandrels successively in the direction of the intermittent further stepping of the mandrels.

4. The apparatus according to claim 2, wherein the cooling or heating medium flows through the blowing mandrels successively contrarily of the further stepping direction.

5. The apparatus according to claim 2, wherein the connection of the cooling or heating medium passages of the mandrels with one another and the supply and withdrawal of the cooling or heating medium take place through connection conduits in a spindle on which said hub of the blowing mandrel star is rotatable with its supply passages.

6. The apparatus according to claim 5, wherein there is arranged in at least one of the parts movable in relation to one another a radially movable sealing piece containing the connection conduits, which bears with a certain pressure on the other of the parts movable in relation to one another.

7. The apparatus according to claim 6, wherein the application pressure of the sealing piece is achieved by spring effect.

8. The apparatus according to claim 7, wherein radially movable sealing pieces are inserted into the spindle, each of which pieces covers over the supply passage and the discharge passage of two adjacent blowing mandrels and is in turn sealed off in relation to the spindle.

9. The apparatus according to claim 8, wherein the seal ensures the resilient abutment pressure of said sealing pieces by reason of its dispositions.

10. The apparatus according to claim 9, wherein shunt conduits are provided connectable in parallel with parts of the series connection of the cooling or heating medium conduit.

11. The apparatus according to claim 10, wherein the throughflow quantity in the shunt conduits is regulable.

12. The apparatus according to claim 11, wherein the throughflow cross-section of at least one of said main conduit or said auxiliary conduits is variable.

13. The apparatus according to claim 12, wherein the length and/or position of said shunt conduit are selectable and/or variable.

14. The apparatus according to claim 13, wherein two or more shunt conduits which may be provided with different position and/or length can be connected in parallel with one section of the main throughflow conduit.

15. The apparatus according to claim 14, wherein a bore or opening, connecting the supply conduit for the throughflow medium with its outlet conduit, as shunt to the entire throughflow conduit of said blowing mandrel.

16. The apparatus according to claim 15, characterized in that in blowing mandrels having coaxially arranged inlet and return conduits for the cooling or heating medium, further shunt bores or openings are provided in distribution over the length of these passages, which connect the inlet and return conduits with one another.

17. The apparatus according to claim 16, wherein three coaxial throughflow passages are provided for the cooling or heating medium in said blowing mandrel, of which the two outer are more or less greatly connectable with one another and the throughflow medium can be deflected out of one of these two passages more or less intensely into the other.

18. The apparatus according to claim 17, wherein the deflection of the throughflow medium from one passage into the other and back is accomplished by constrictions in these passages which may be displaceably formed.

* * * * *